G. W. TURNEY.
METHOD OF MAKING RADIATOR TUBES.
APPLICATION FILED DEC. 6, 1915.

1,217,537.

Patented Feb. 27, 1917.

George W. Turney, Inventor
By his Attorney

UNITED STATES PATENT OFFICE.

GEORGE W. TURNEY, OF ROME, NEW YORK, ASSIGNOR TO ROME-TURNEY RADIATOR CO., OF ROME, NEW YORK, A CORPORATION OF NEW YORK.

METHOD OF MAKING RADIATOR-TUBES.

1,217,537.

Specification of Letters Patent.

Patented Feb. 27, 1917.

Application filed December 6, 1915. Serial No. 65,265.

*To all whom it may concern:*

Be it known that I, GEORGE W. TURNEY, a citizen of the United States, residing at Rome, Oneida county, State of New York, have invented certain new and useful Improvements in Methods of Making Radiator-Tubes, the following being a full, clear, and exact disclosure of the one form of my invention which I at present deem preferable.

For a detailed description of the present form of my invention, reference may be had to the following specification and to the accompanying drawing, which illustrates my invention, wherein—

Figure 1:
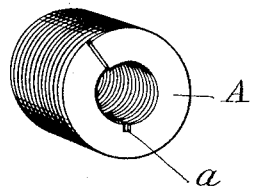
Figure 1 shows the helical flange in its original form.
Figure 2:
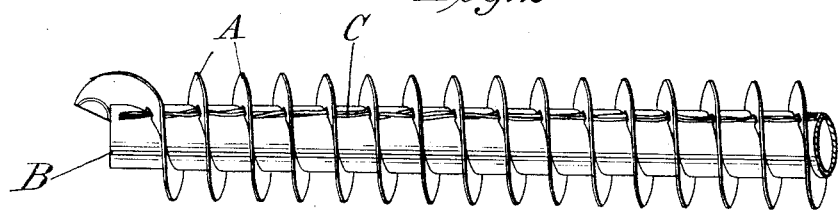
Fig. 2 shows the flange applied to the tube.

My invention relates to a radiator-tube which is provided with an external flange to increase the extent of its radiating surface. I make a tube of that description by first forming a flange as a separate article in the form of a helix of resilient metallic ribbon coiled edgewise and preferably provided with a slot or recess along the inner periphery of the several convolutions. Normally this flange would be in the form of a closed helix, the several convolutions tending to spring together in contact with one another. Such a helix is shown in Fig. 1, A being the coiled ribbon and *a* the slot or recess formed therein. Having an annular coiled flange of this description, I apply it to a tube by inserting the tube through the central opening therein, and then distending the several convolutions along the tube and holding them spaced apart at a uniform distance in any suitable manner. This distention will cause the helix to grip the tube with the inner edge of such convolutions in closed contact therewith. Through the slot formed by the line of recesses I extend a thread of solder C longitudinally with the tube B. The flange and tube will then have the appearance indicated in Fig. 2. I then apply heat sufficient to cause the solder to fuse and flow into and along the cracks between the tube and the several convolutions of the flange, thereby securing the flange to the tube in its distended position thereon. The resulting product is a radiator tube having a helical flange on its outer surface formed of a flat metallic ribbon coiled edgewise with its convolutions distended and secured to the tube in their distended relation.

The aforesaid method of soldering the flange is equally applicable to flanges formed of consecutive rings or disks instead of in a continuous helix, and, moreover, two or more lines of solder like the one illustrated may be employed, if desired.

What I claim as new and desire to secure by Letters Patent is:

1. The method of making radiator tubes comprising coiling a metal ribbon edgewise to form a helical body, distending said body longitudinally along the tube to separate the convolutions of the body, and finally attaching said convolutions to said tube.

2. The method of making a helically-flanged radiator-tube, which consists in separately forming the helical flange in the shape of a metallic ribbon coiled edgewise, distending and spacing the convolutions thereof on the tube together with a thread of solder, and then heating the tube to cause the solder to melt and secure the helical flange to the tube.

3. The method of making a helically-flanged radiator-tube, which consists in separately forming the helical flange as a metallic ribbon closely coiled edgewise, distending and spacing the convolutions thereof along the outside of the tube with a thread of solder underlying it, and heating the tube to fuse the solder and secure the flange to the tube in its distended condition.

4. The method of making a helically-flanged radiator-tube, which consists in separately forming the helical flange as a normally closed helix of resilient metal ribbon coiled edgewise, distending and spacing the convolutions thereof along the outside of the tube and securing it in that position by attaching it to the tube.

5. The method of making a helically-flanged radiator-tube, which consists in separately forming the flange in the shape of a metallic ribbon coiled edgewise and having a solder-recess on its inner edge, distending and spacing the convolutions thereof along the outside of the pipe with a thread of solder extending through said recess, and heating the tube to fuse said solder and thereby secure the flange to the tube.

6. The method of making a helically-flanged radiator-tube, which consists in separately forming the flange in the shape of a metallic ribbon coiled edgewise, distending and spacing the convolutions thereof along the tube together with a longitudinal thread of solder, and heating the tube to cause the solder to fuse and secure the flange to the tube in its distended position.

7. The method of making radiator tubes comprising coiling a metal ribbon edgewise to form a helical body, distending said body longitudinally along the tube to separate the convolutions of the body, applying solder transversely to each convolution of said body, and finally heating the tube to fuse the solder.

8. The method of making radiator tubes comprising coiling a metal ribbon edgewise to form a helical body, distending said body longitudinally along the tube to separate the convolutions of the body, applying a line of solder between the flanges and the tube, and longitudinally of the tube, and finally heating the tube to fuse the solder.

In witness whereof I have hereunto set my hand this 3rd day of December, 1915.

GEORGE W. TURNEY.